US009432322B2

(12) United States Patent
Tetsuhashi

(10) Patent No.: US 9,432,322 B2
(45) Date of Patent: Aug. 30, 2016

(54) ELECTRONIC STICKY NOTE SYSTEM, INFORMATION PROCESSING TERMINAL, METHOD FOR PROCESSING ELECTRONIC STICKY NOTE, MEDIUM STORING PROGRAM, AND DATA STRUCTURE OF ELECTRONIC STICKY NOTE

(75) Inventor: Hideaki Tetsuhashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 656 days.

(21) Appl. No.: 13/000,864

(22) PCT Filed: Jul. 23, 2009

(86) PCT No.: PCT/JP2009/063537
§ 371 (c)(1),
(2), (4) Date: Dec. 22, 2010

(87) PCT Pub. No.: WO2010/010967
PCT Pub. Date: Jan. 28, 2010

(65) Prior Publication Data
US 2011/0115825 A1    May 19, 2011

(30) Foreign Application Priority Data
Jul. 25, 2008 (JP) .................................. 2008-191889

(51) Int. Cl.
*G06F 17/00* (2006.01)
*H04L 12/58* (2006.01)
(Continued)

(52) U.S. Cl.
CPC .............. *H04L 51/22* (2013.01); *G06F 3/0483* (2013.01); *G06F 3/04842* (2013.01); *G06F 17/241* (2013.01)

(58) Field of Classification Search
CPC ... H04W 12/06; H04W 12/08; H04W 24/00; H04W 4/00; H04W 4/02; H04W 4/16; H04W 88/06; H04W 36/00; H04W 84/18; H04W 24/02; H04W 24/10; H04W 28/08; H04W 4/001; H04W 4/003; H04W 4/12; H04W 72/04
USPC ......................................... 715/230, 201, 203
See application file for complete search history.

(56) References Cited

U.S. PATENT DOCUMENTS

| 6,551,357 | B1 | 4/2003 | Madduri | |
|---|---|---|---|---|
| 2005/0223315 | A1* | 10/2005 | Shimizu et al. | ............... 715/512 |
| 2009/0063642 | A1* | 3/2009 | Lord | ............................. 709/206 |

FOREIGN PATENT DOCUMENTS

| JP | 5-257633 A | 10/1993 |
|---|---|---|
| JP | 2001134415 A | 5/2001 |

(Continued)

OTHER PUBLICATIONS

Robert Cowart, Special Edition Using Microsoft® Windows® XP Professional, Third Edition (2004).*
James J. Maivald, A Designer's Guide to Adobe® InDesign® and XML( 2007).*
(Continued)

*Primary Examiner* — Amy Ng
*Assistant Examiner* — Di Xiao

(57) ABSTRACT

Provided is a technology enable to associate electronic sticky data with any application and to execute the application. An electronic sticky note system includes display means for displaying an electronic sticky note, storage means for storing sticky note information which includes header information to be displayed in a display area for the electronic sticky note, sticky note displaying position information indicating a position to be displayed the electronic sticky note, and application associating information corresponding to information for activating the application associated with the electronic sticky note, control means for displaying, by the display means, the electronic sticky note on the basis of the header information and the electronic sticky note displaying position information and for executing the application on the basis of the application associating information, and input means for inputting the sticky note information. In the electronic sticky note system, an application, which is associated with the electronic sticky note, includes other than the application which is indicated by the sticky note displaying position information.

18 Claims, 21 Drawing Sheets

(51) Int. Cl.
G06F 3/0483 (2013.01)
G06F 17/24 (2006.01)
G06F 3/0484 (2013.01)

(56) References Cited

FOREIGN PATENT DOCUMENTS

| | | | |
|---|---|---|---|
| JP | 2003099424 | | 4/2003 |
| JP | 2006031666 | A | 2/2006 |
| JP | 2006185334 | A | 7/2006 |
| JP | 2007200243 | A | 8/2007 |
| WO | 2010/010967 | A1 | 1/2010 |

OTHER PUBLICATIONS

Jim Boyce, Microsoft Outlook 2003 Inside Out (2003).*
Joan Lambert, Windows Vista Step by Step (2006).*
Kahan J et al : "Annotea: an open RDF infrastructure for shared Web annotations", Networks, Elsevier Science Publishers B.V. ,Amsterdam, NL, vol. 39, No. 5, Aug. 5, 2002, pp. 589-608, XP004369434, ISSN: 1389-1286, DOI: 10.1016/S1389-1286(02)00220-7.
Extended European search report for EP09800478.1 dated Mar. 12, 2012.
International Search Report for PCT/JP2009/063537 mailed Oct. 27, 2009.
Japanese Office Action for JP Application No. 2014-104571 mailed on Mar. 24, 2015 with English Translation.

* cited by examiner

Fig.6

| ID | HEADER | STICKY NOTE DISPLAYING POSITION | APPLICATION ASSOCIATING INFORMATION |
|---|---|---|---|
| 001 | AT HACHIKO ENTRANCE OF SHIBUYA STATION AT 18:00 | [STICKING AP] ELECTRONIC MAIL [MAIL ID] RCV20080504001 [COORDINATE] $(X_{11}, Y_{11}), (X_{12}, Y_{12})$ | [ACTIVATED AP] NOTHING |
| .... | .... | .... | .... |

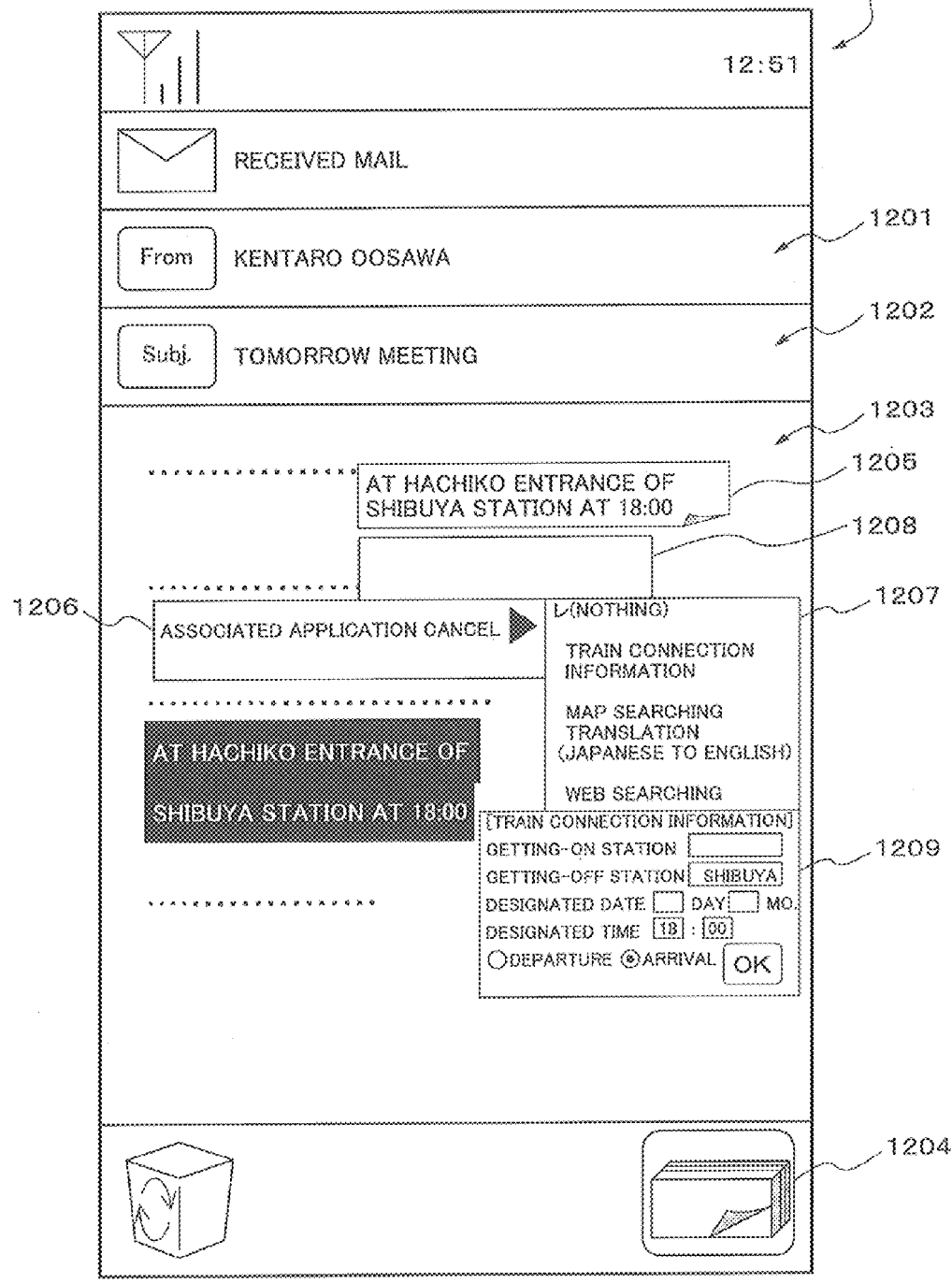

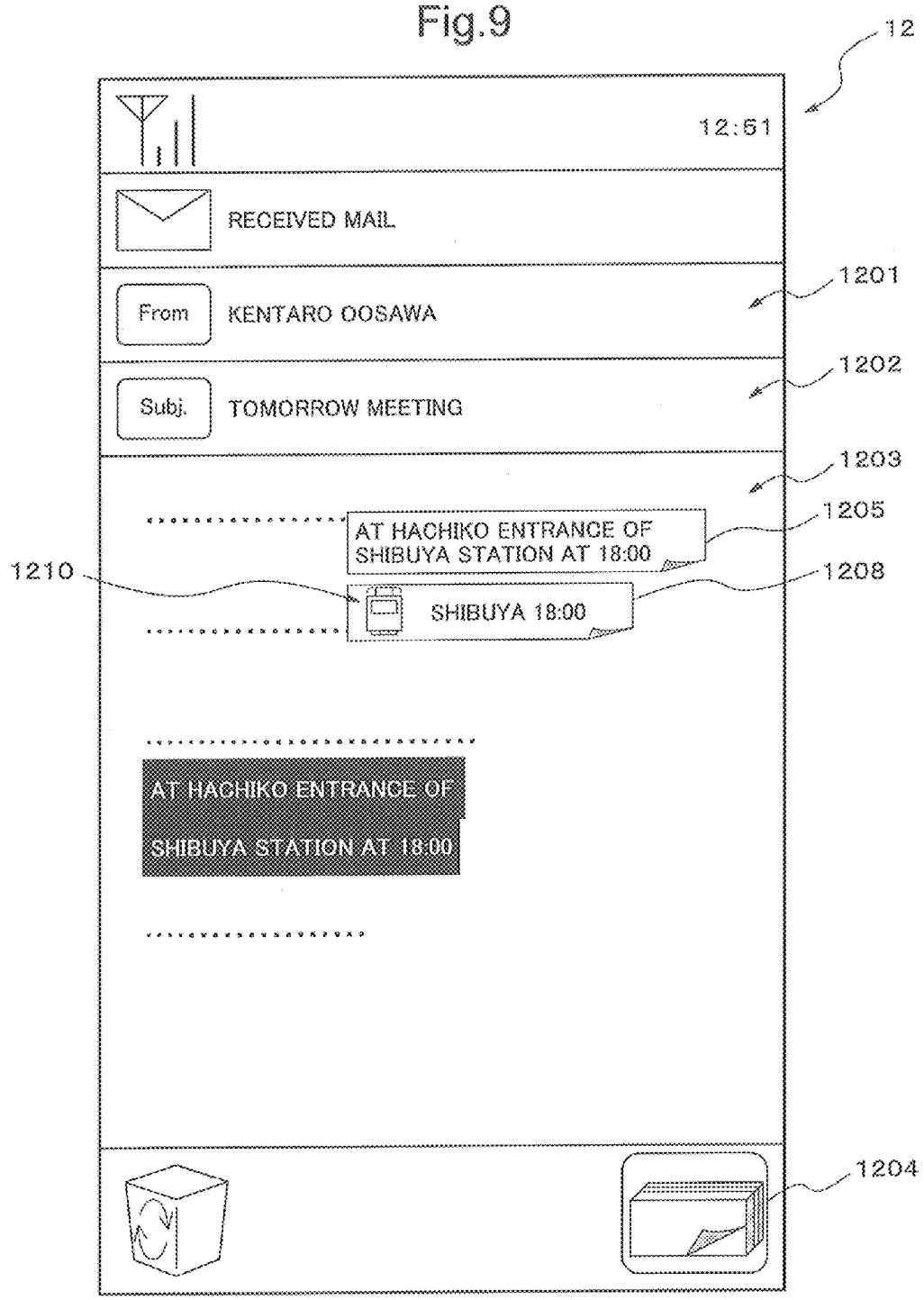

Fig.10

| ID | HEADER | STICKY NOTE DISPLAYING POSITION | APPLICATION ASSOCIATING INFORMATION |
|---|---|---|---|
| 001 | AT HACHIKO ENTRANCE OF SHIBUYA STATION AT 18:00 | [STICKING AP] ELECTRONIC MAIL [MAIL ID] RCV20080504001 [COORDINATE] $(X_{11}, Y_{11}), (X_{12}, Y_{12})$ | [ACTIVATED AP] NOTHING |
| 002 | SHIBUYA 18:00 | [STICKING AP] ELECTRONIC MAIL [MAIL ID] RCV20080504001 [COORDINATE] $(X_{21}, Y_{21}), (X_{22}, Y_{22})$ | [ACTIVATED AP] TRAIN CONNECTION INFORMATION [GETTING-OFF STATION] SHIBUYA [DESIGNATED TIME] 18:00 ARRIVAL |
| ... | ... | ... | ... |

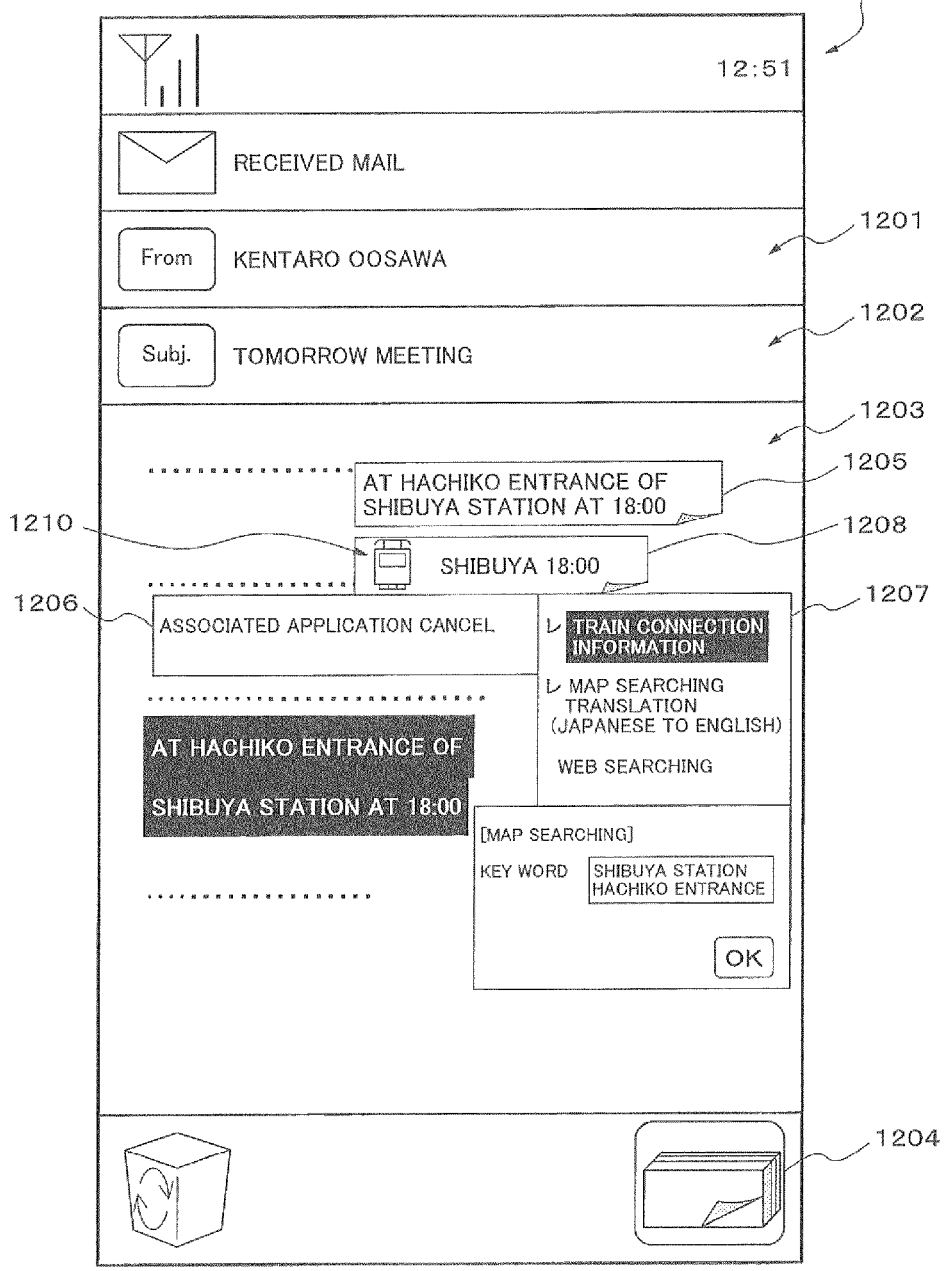

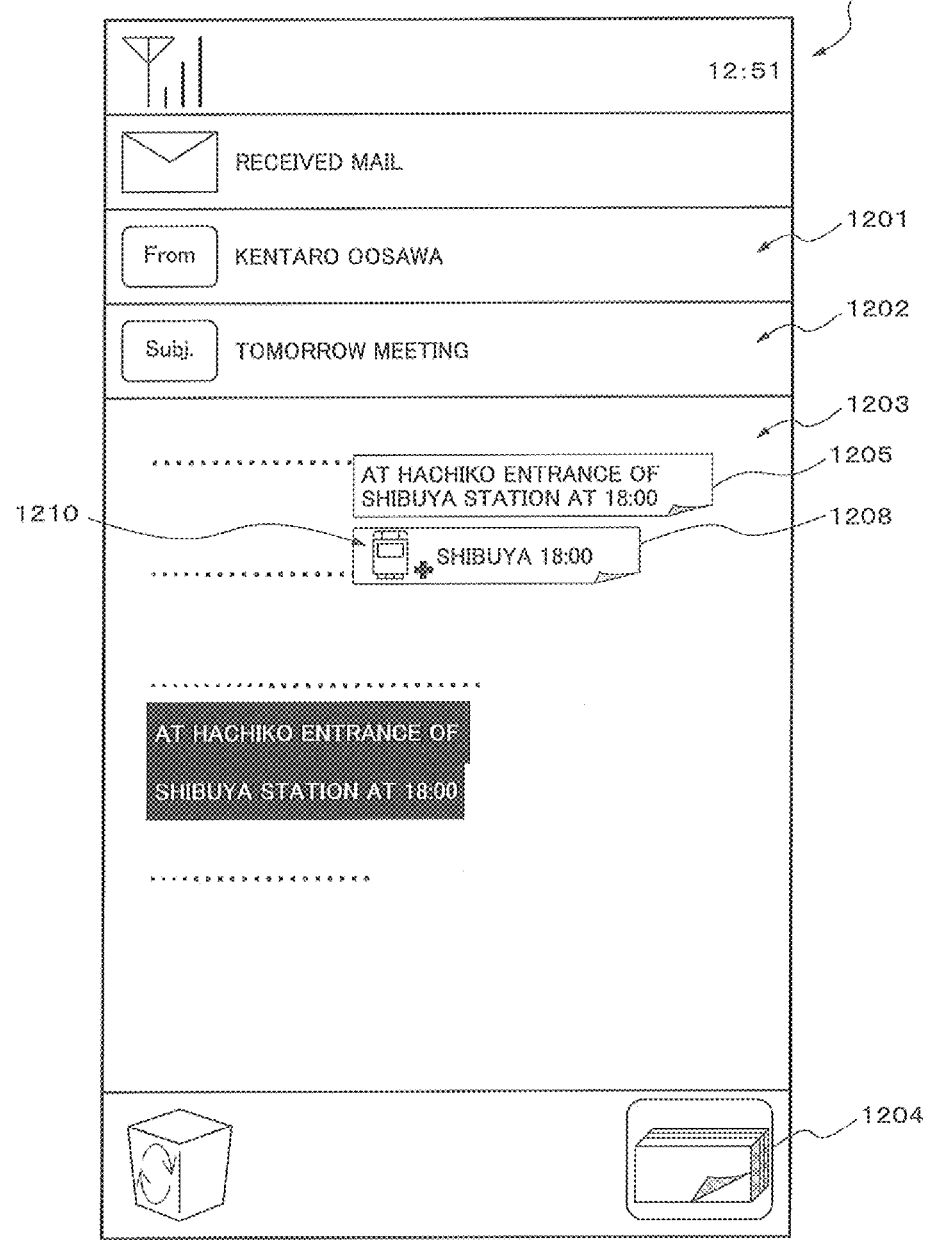

Fig. 17

| ID | HEADER | STICKY NOTE DISPLAYING POSITION | APPLICATION ASSOCIATING INFORMATION |
|---|---|---|---|
| 001 | AT HACHIKO ENTRANCE OF SHIBUYA STATION AT 18:00 | [STICKING AP] ELECTRONIC MAIL [MAIL ID] RCV20080504001 [COORDINATE] $(X_{11}, Y_{11})$, $(X_{12}, Y_{12})$ | [ACTIVATED AP] NOTHING |
| 002 | SHIBUYA 18:00 | [STICKING AP] ELECTRONIC MAIL [MAIL ID] RCV20080504001 [COORDINATE] $(X_{21}, Y_{21})$, $(X_{22}, Y_{22})$ | [ACTIVATED AP] TRAIN CONNECTION INFORMATION [GETTING-OFF STATION] SHIBUYA [DESIGNATED TIME] 18:00 ARRIVAL |
| ... | ... | ... | [ACTIVATED AP] MAP SEARCHING [KEY WORD] SHIBUYA STATION HACHIKO ENTRANCE |
| | | | ... |

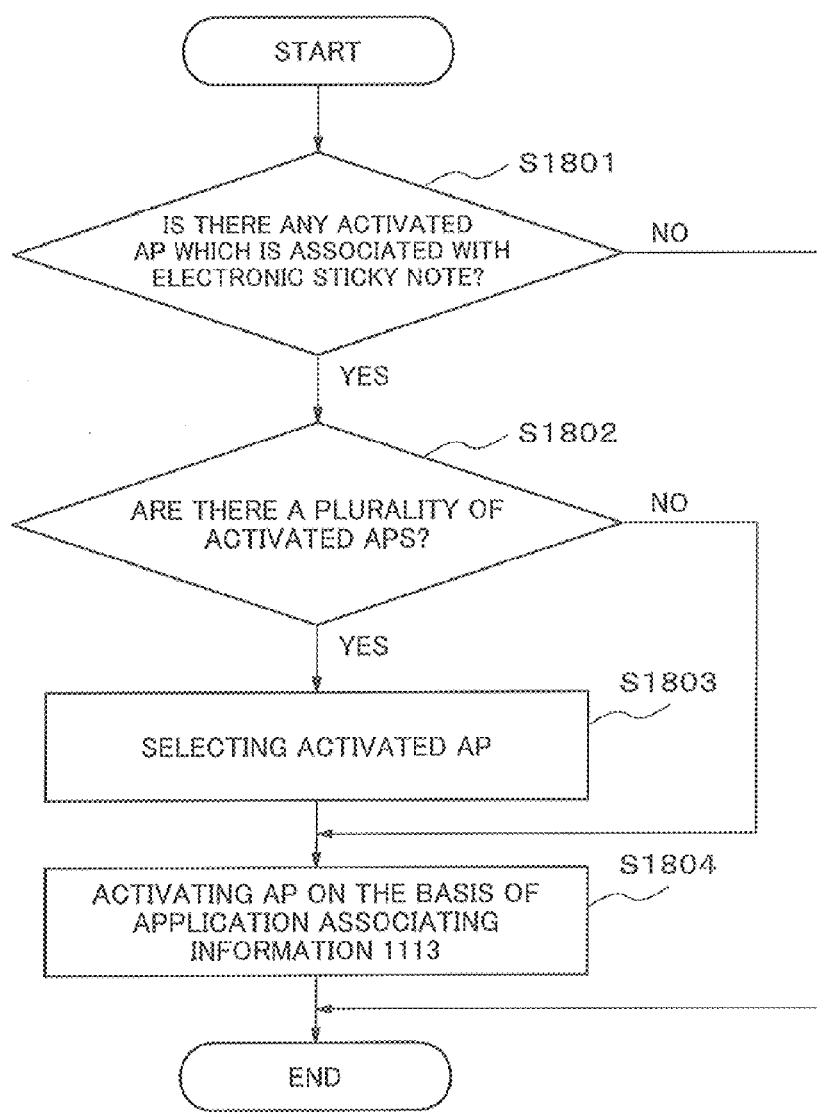

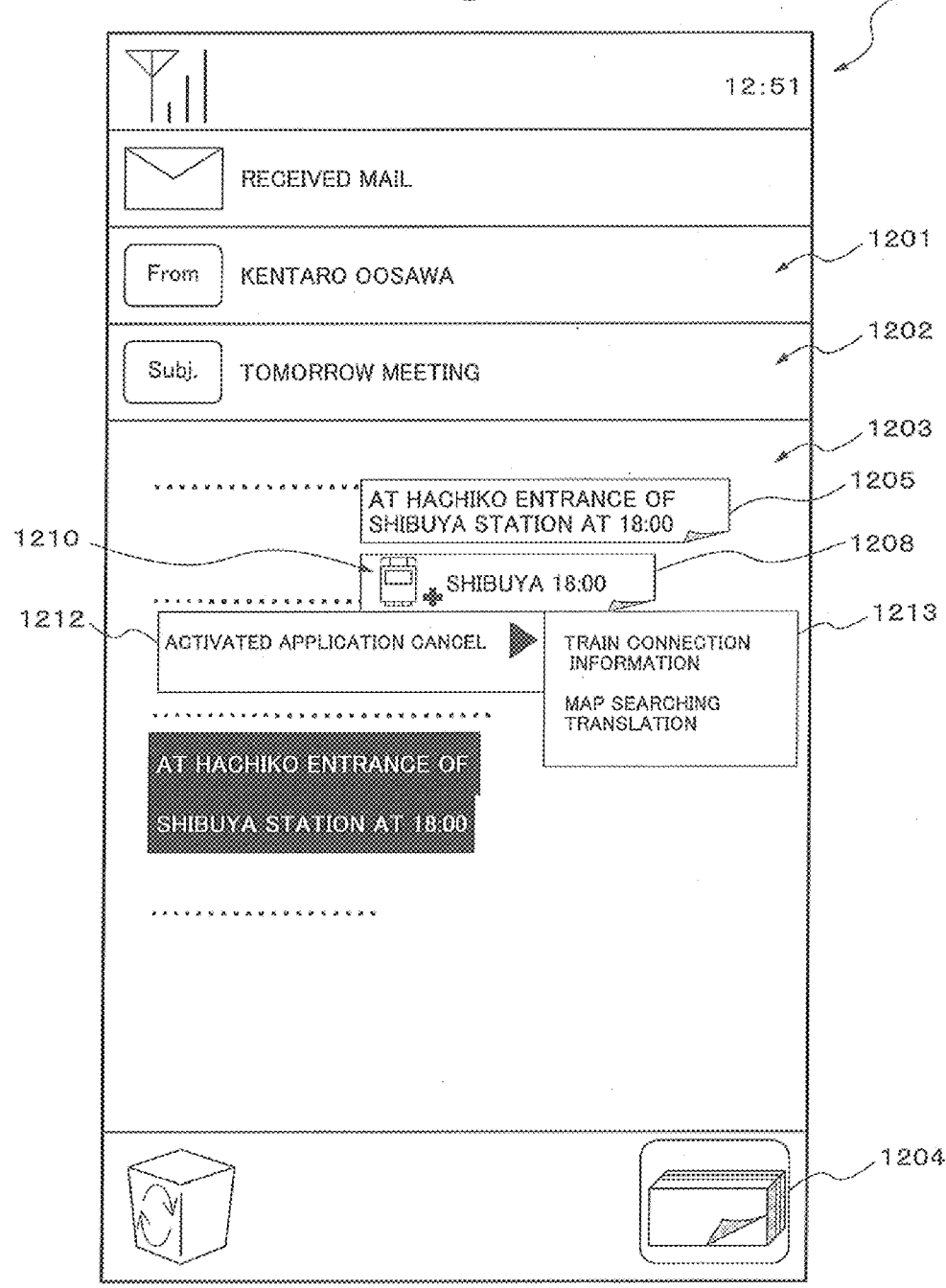

ELECTRONIC STICKY NOTE SYSTEM, INFORMATION PROCESSING TERMINAL, METHOD FOR PROCESSING ELECTRONIC STICKY NOTE, MEDIUM STORING PROGRAM, AND DATA STRUCTURE OF ELECTRONIC STICKY NOTE

This application is the National Phase of PCT/JP2009/063537, filed Jul. 23, 2009, which is based upon and claims the benefit of priority from Japanese Patent Application No. 2008-191889, filed on Jul. 25, 2008, the disclosure of which is incorporated herein in their entirety by reference.

TECHNICAL FIELD

The present invention relates to an electronic sticky note system, an information processing terminal, a method for processing an electronic sticky note, a medium storing a program and, data structure of the electronic sticky note.

BACKGROUND ART

There exists a software to display a memo (hereinafter, referred to as "electronic sticky note") in a shape, which imitates a shape of a sticky note, on a display area of a display unit of a computer. These are called an electronic sticky note system, sticky note software or the like. By use of the software, user can store a text as the electronic sticky note, and modify and delete contents of the electronic sticky note. Patent document 1 discloses an example of such the electronic sticky system.

Patent document 2 discloses an example of a system in which an application is activated and executed by use of data of the electronic sticky note. The electronic document reading system, which is disclosed in the patent document 2, displays a list of text of the electronic sticky note which is stuck on an electronic document, and displays contents of the electronic document which are described in an area where the sticky note selected out of the displayed list is stuck. By the above mention, user can use the electronic sticky note like "bookmark" which is put in the electronic document.

Patent document 1: Japanese Patent Application Laid-Open No. 1993 (Hei 5)-257633
Patent document 2: Japanese Patent Application Laid-Open No. 2006-031666
Patent document 3: Japanese Patent Application Laid-Open No. 2001-134415

DISCLOSURE OF THE INVENTION

A Problem to be Solved by the Invention

According to the electronic document reading system described in the patent document 2 mentioned above, the application, which is activated by use of data of the electronic sticky note, is limited to the electronic document reading application so as to display the electronic document on which the electronic sticky note is stuck. That is, the application which is activated by use of data of the electronic sticky note cannot be changed to another application. For example, it is impossible to search a dictionary by use of the text of the electronic sticky note after activating a dictionary application. Since it is impossible to apply the data of the electronic sticky note to the other application according to the electronic sticky note system mentioned above. For this reason, in such the electronic sticky note system, low operability becomes problematic.

An object of the present invention is to solve the problem mentioned above. That is, the object of the present invention is to provide an electronic sticky note system, an information processing terminal, a method for processing an electronic sticky note, a medium storing a program and, data structure of the electronic sticky note, which make it possible to associate data of the electronic sticky note with any application and to execute the application.

Means to Solve the Problem

An electronic sticky note system according to the present invention is characterized by including:
 display means for displaying an electronic sticky note;
 storage means for storing sticky note information which includes header information to be displayed in a display area for the electronic sticky note, sticky note displaying position information indicating a position to be displayed the electronic sticky note, and application associating information corresponding to information for activating an application associated with the electronic sticky note;
 control means for displaying, by the display means, the electronic sticky note on the basis of the header information and the electronic sticky note displaying position information and for executing the application on the basis of the application associating information; and
 input means for inputting the sticky note information,
 wherein an application, which is associated with the electronic sticky note, includes other than the application which is indicated by the sticky note displaying position information.

An information processing terminal according to the present invention is characterized by including the electronic sticky note system mentioned above.

A method for processing an electronic sticky note according to the present invention is characterizing by including a step of:
 storing sticky note information which includes header information to be displayed in a display area for an electronic sticky note, sticky note displaying position information indicating position to be displayed the electronic sticky note, and application associating information corresponding to information for activating an application associated with the electronic sticky note; and
 displaying the electronic sticky note on the basis of the header information and the electronic sticky note displaying position information; and
 executing the application on the basis of the application associating information,
 wherein an application, which is associated with the electronic sticky note, includes other than the application which is indicated by the sticky note displaying position information.

A medium storing a program according to the present invention stores a program causing a computer to execute an electronic sticky note process, the electronic sticky note process includes a step of:
 storing sticky note information which includes header information to be displayed in a display area for an electronic sticky note, sticky note displaying position information indicating a position to be displayed the electronic sticky note, and application associating information corresponding to information for activating an application associated with the electronic sticky note;

displaying the electronic sticky note on the basis of the header information and the electronic sticky note displaying position information; and executing the application on the basis of the application associating information, wherein an application, which is associated with the electronic sticky note, includes other than the application which is indicated by the sticky note displaying position information.

Data structure of an electronic sticky note according to the present invention is characterized in that the data structure includes header information to be displayed in a display area for the electronic sticky note, sticky note displaying position information indicating position to be displayed electronic sticky note, and application associating information corresponding to information for activating an application associated with the electronic sticky note; and an application, which is associated with the electronic sticky note, includes other than the application which is indicated by the sticky note displaying position information.

The Effect of the Invention

The electronic sticky note system, the information processing terminal, the method for processing the electronic sticky note, the medium storing the program, and the data structure of the electronic sticky note according to the present invention make it possible to associate the data of the electronic sticky note with any application and execute the application.

BRIEF DESCRIPTION OF THE DRAWINGS

FIG. 6 shows data which is stored in a sticky note information table.

FIG. 8 shows an image displayed by the display unit of the information processing terminal.

FIG. 9 shows an image displayed by the display unit of the information processing terminal.

FIG. 10 shows data which is stored in the sticky note information table.

FIG. 15 shows an image displayed by the display unit of the information processing terminal.

FIG. 16 shows an image displayed by the display unit of the information processing terminal.

FIG. 17 shows data which is stored in a sticky note information table.

FIG. 18 is a flowchart showing an associated application executing process according to the second exemplary embodiment.

FIG. 19 shows an image displayed by the display unit of the information processing terminal.

DESCRIPTION OF A CODE

Figure 1:
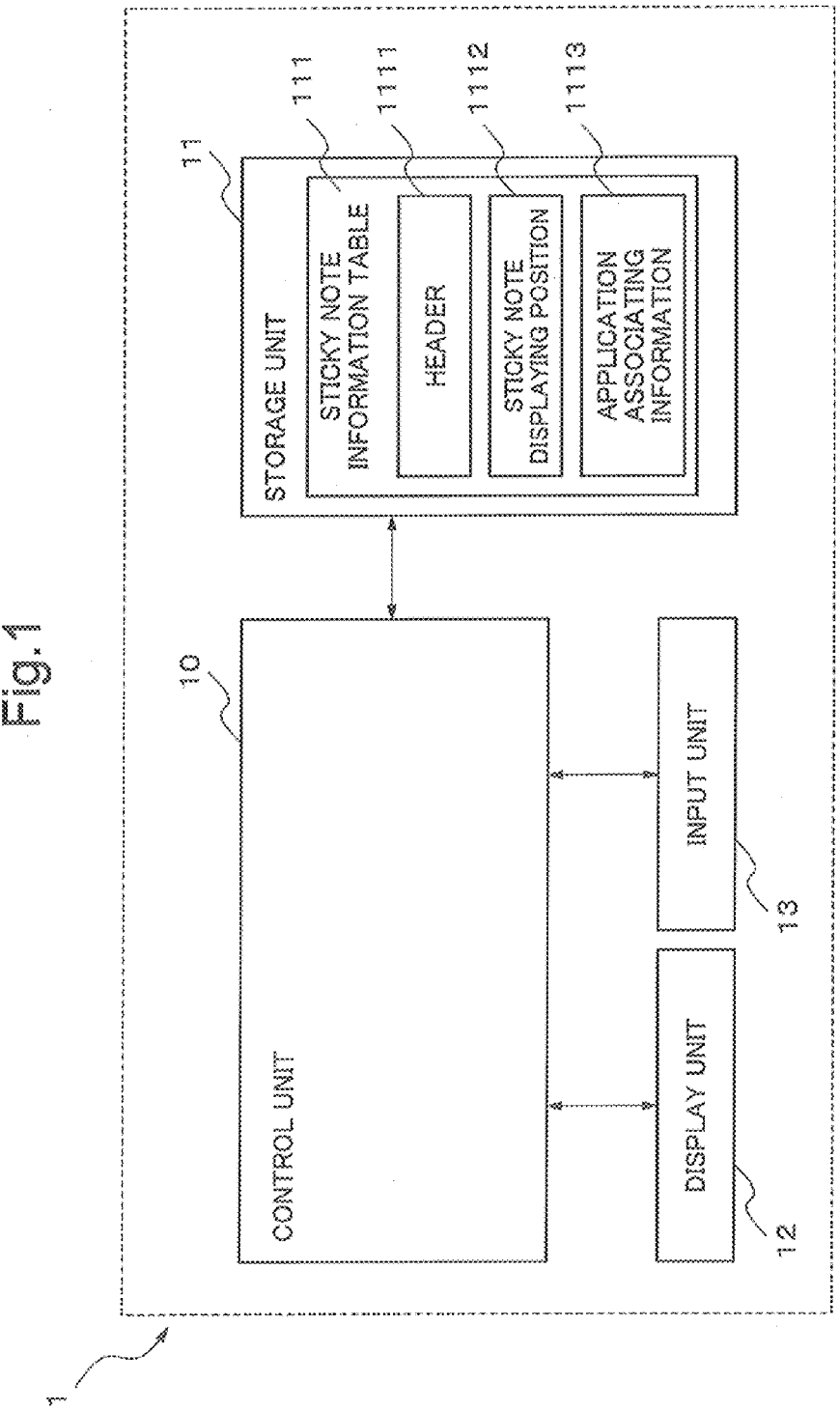
FIG. 1 is a block diagram showing a functional configuration of an information processing terminal according to a first exemplary embodiment of the present invention.

1 Information processing terminal
10 Control unit
11 Storage unit
111 Sticky note information table
1111 Header
1112 Sticky note displaying position
1113 Application associating information
12 Display unit
1201 Mail source
1202 Mail subject
1203 Mail body
1204 Sticky note icon
1205 and 1208 Electronic sticky note
1206 Associated application designating menu
1207 Application list menu
1209 Input window of inputting parameter for activating train connection information
1210 Application icon
1211 Input window for inputting parameter of map searching
1212 Activated AP selecting menu
1213 Activated AP list menu
13 Input unit

THE BEST MODE FOR CARRYING OUT THE INVENTION

Next, an exemplary embodiment of the present invention will be described with reference to drawings.

A First Exemplary Embodiment

FIG. 1 is a block diagram showing a functional configuration of an information processing terminal 1 of an electronic sticky note system according to a first exemplary embodiment of the present invention. The information processing terminal 1 is a personal computer, a mobile phone, PDA (Personal Digital Assistant), a smart phone or the like. The information processing terminal 1 includes a control unit 10, a storage unit 11, a display unit 12 and an input unit 13.

The control unit 10, which is composed of CPU (Central Processing Unit), various device control units or the like, carries out various calculations and executes a program and controls whole processes of the information processing terminal 1.

The storage unit 11, which is an information storing device such as a memory device, a magnetic disk device or the like, stores a sticky note information table 111. Additionally, the storage unit 11 stores a program, which is carried out by the control unit 10, for example an operating system, an application or the like, and various data for carrying out the operating system, the program or the like.

The display unit 12, which is a display device such as a liquid crystal display, displays an image. For example, the display unit 12 displays an image of an electronic sticky note, a menu for inputting the sticky note information 111 or the like.

The input unit 13, which is an input device such as a keyboard, a touch panel, a mouse or the like, has a function to input character information such as a text, and position information such as X and Y coordinates.

The sticky note information table 111 manages sticky note information which indicates a state of each electronic sticky note. Further, it may be applicable that the sticky note information is managed, for example by a database or the like other than the table. The sticky note information includes a header 1111 which is displayed in a display area for the electronic sticky note, a sticky note displaying position 1112 which indicates a position where the electronic sticky note is stuck and displayed, and application associating information 1113 which is information for activating an application associated with the electronic sticky note. The control unit 10 makes the display unit 12 display the electronic sticky note on the basis of the header 1111 and the sticky note displaying position 1112, and executes the application on the basis of the application associating information 1113.

It may be applicable that the function and the process, which are mentioned above, are realized by hardware or a program which is executed by CPU of the control unit 10.

As mentioned above, the sticky note information includes data for displaying the electronic sticky note, and data for activating the associated application. Moreover, the control unit 10 displays the electronic sticky note and executes the application, which is associated with the displayed electronic sticky note, on the basis of these data. By virtue of this, according to the first exemplary embodiment of the present invention, it is possible to activate and execute any application, which is associated with the electronic sticky note data with no relation to the area where the electronic sticky note is stuck.

Figure 2:
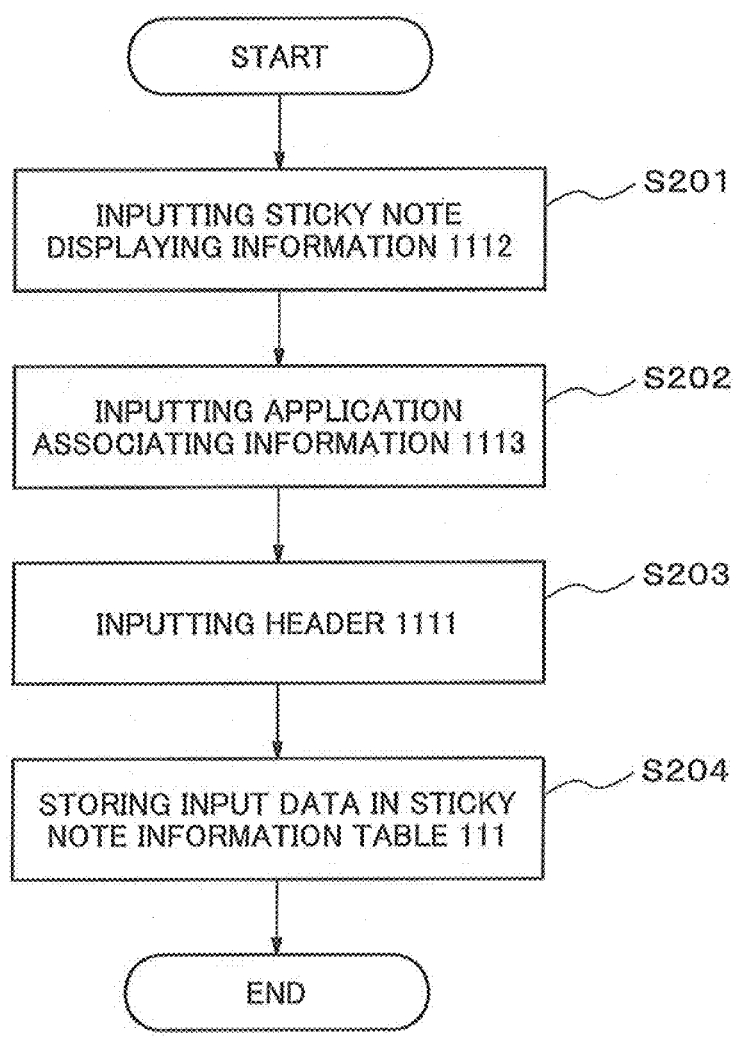
FIG. 2 is a flowchart showing an electronic sticky note making process according to the first exemplary embodiment.
Figure 3:
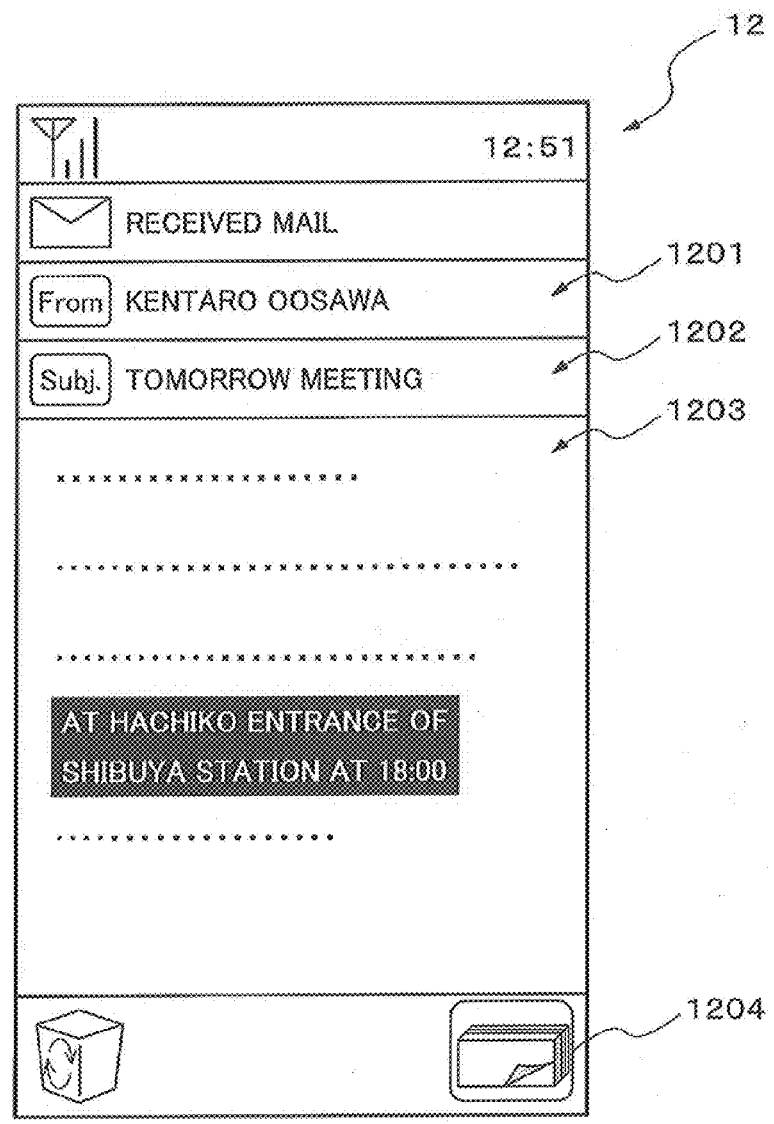
FIG. 3 shows an image displayed by a display unit of the information processing terminal.
Figure 4:
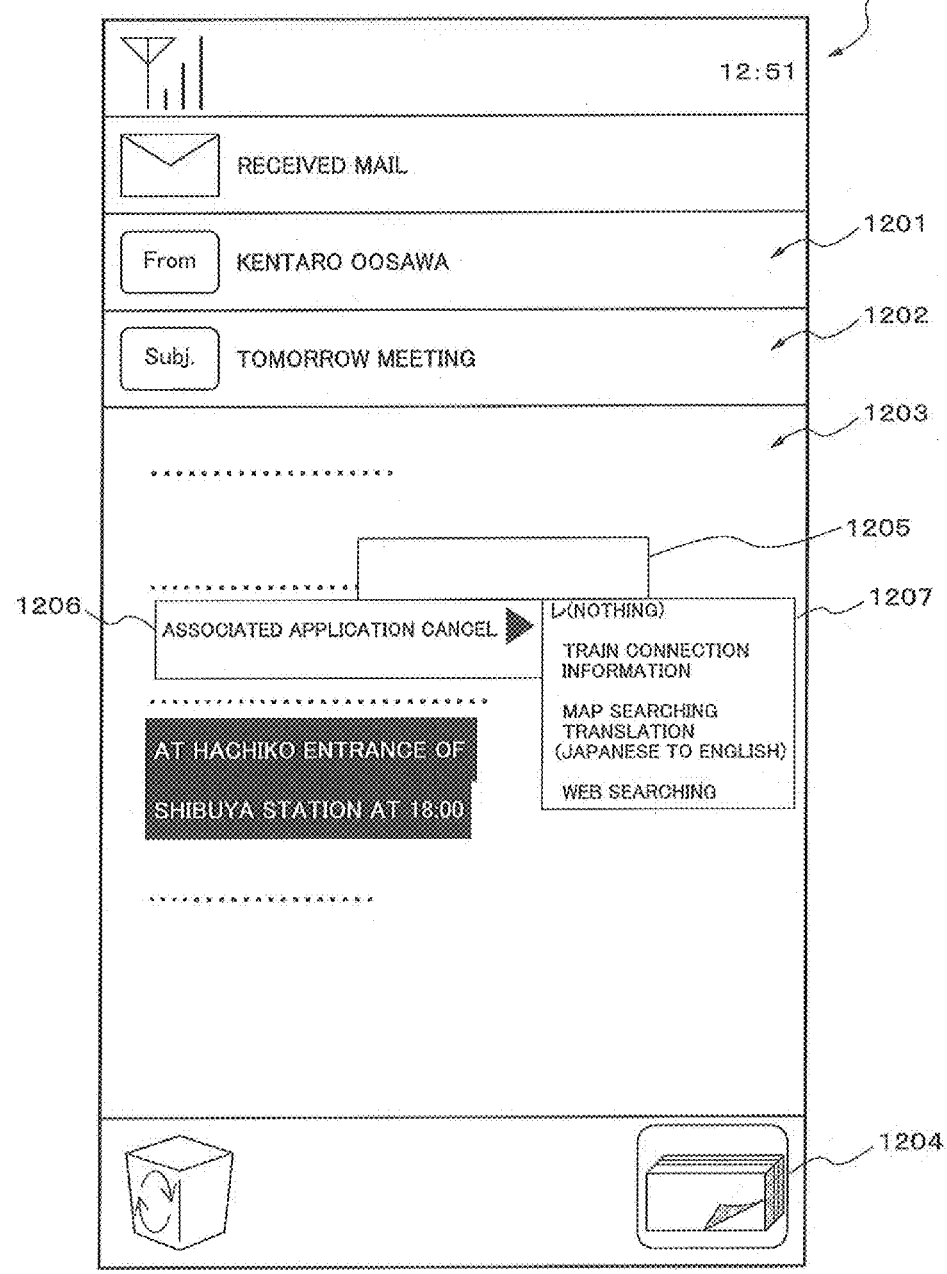
FIG. 4 shows an image displayed by the display unit of the information processing terminal.
Figure 5:
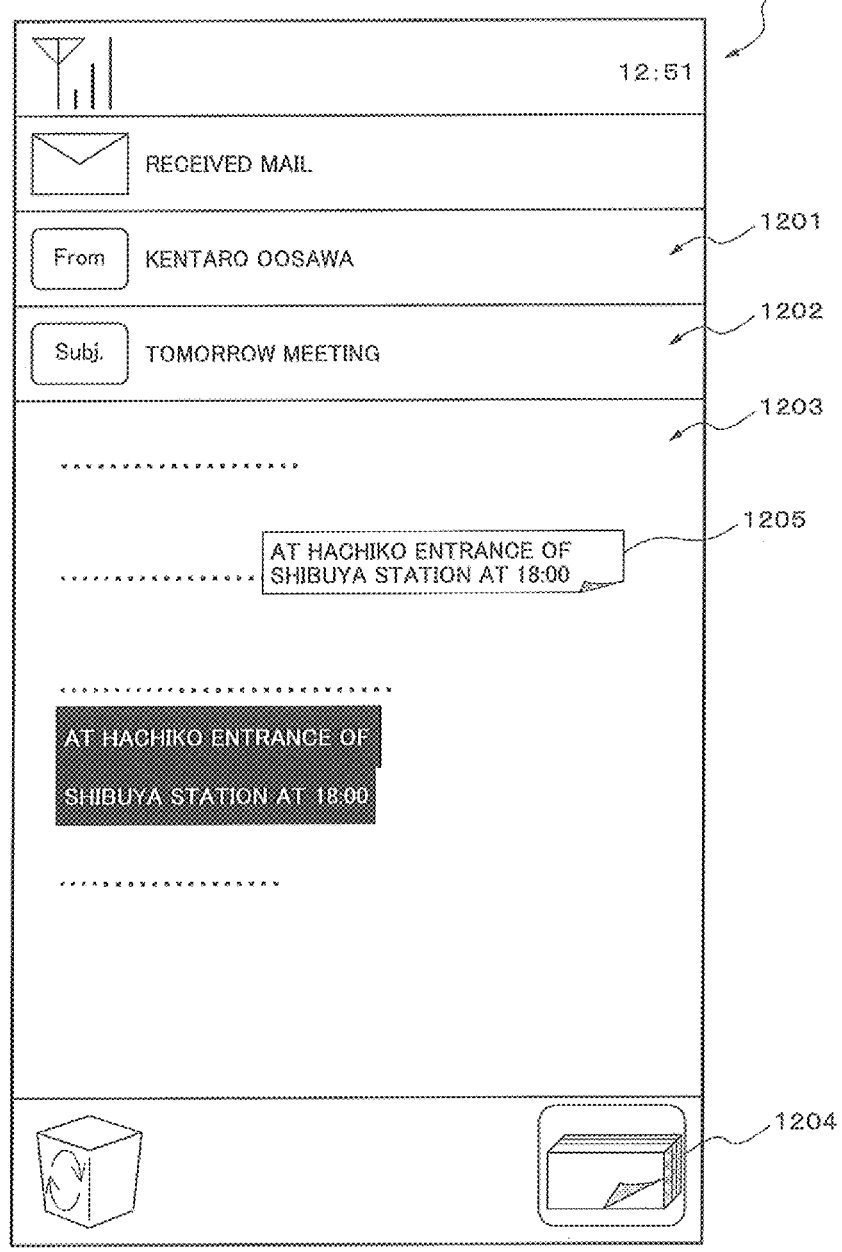
FIG. 5 shows an image displayed by the display unit of the information processing terminal.

Next, an example of an electronic sticky note making process, which is carried out in the electronic sticky note system according to the first exemplary embodiment, will be described in a sequence of time with reference to FIGS. 2 to 6. FIG. 2 is a flowchart explaining the electronic sticky note making process according to the first exemplary embodiment. FIGS. 3 to 5 show images displayed by the display unit 12 of the information processing terminal 1. FIG. 6 shows data which is stored in the sticky note information table 111. Hereinafter, it is assumed that the input unit 13 is equipped with a touch panel, which is superimposed on the display unit 12, for inputting the position information.

FIG. 3 shows a state in which an electronic mail application is activated, and a mail received by the information processing terminal 1 is displayed. The display unit 12 displays a mail source 1201, a mail subject 1202 and a mail body 1203. A sticky note icon 1204 is displayed on a lower part of the display unit 12. A part of the text of the mail body 1203 "at Hachiko entrance of Shibuya station at 18:00" is selected and displayed in reverse colors by carrying out an operation to drag a corresponding part (operation to touch a touch panel and to move the touched part while touching the touch panel). (Note for understanding this English translation document of the present PCT application: "Hachiko entrance" is a popular name of a ticket gate of "Shibuya station".)

By being instructed a start of the electronic sticky note process from the input unit 13, the control unit 10 starts the process. It may be, for example, that the direction is carried out by touching the sticky note icon on the touch panel and dragging the sticky note icon to a position where the sticky note is displayed. It may be also applicable that the direction is carried out only by touching the sticky note icon 1204.

When the input unit 13 directs to start the electronic note making process, the control unit 10 receives an input of the sticky note displaying position 1112 (S201). It may be applicable that the sticky note displaying position 1112 is inputted by user's touching any position on the touch panel. Moreover, it may be applicable that an end position in the operation of dragging the sticky note icon 1204 according to the direction to start the electronic sticky note making process is inputted as it is. When inputting the sticky note displaying position 1112 is completed, the control unit 10 receives an input of the application associating information 1113 (S202).

FIG. 4 shows a state in which the application associating information 1113 is inputted. An electronic sticky note 1205 is displayed at a position where the sticky note displaying position 1112 indicates. However, a header of the electronic sticky note 1205 is blank since the header is not inputted. Moreover, an associated application designating menu 1206 is displayed near the electronic sticky note 1205. Moreover, an application list menu 1207 is displayed adjacently to the associated application designating menu 1206. The application list menu 1207 displays applications, which can be activated and executed in association with the electronic sticky note, in at-a-glance form.

When any one of application is selected out from the application list menu 1207, the selected application is inputted to the control unit 10 as an application which is associated with the electronic sticky note. Here, it is assumed that "(nothing)", which means that application is not associated, is selected.

When inputting the application associating information 1113 is completed, the control unit 10 receives an input of the header 1111 (S203). As the header 1111, the selected part of the text of the mail body 1203 "at Hachiko entrance of Shibuya station at 18:00" is inputted automatically. Moreover, it may be also applicable that contents of the mail source 1201 and the mail subject 1202 are inputted automatically. Moreover, it may be also applicable that a part or a whole of the text, which is inputted as the header 1111, is inputted by hand. Here, it is assumed that the text "at Hachiko entrance of Shibuya station at 18:00" is inputted as it is.

When inputting the header 1111 is completed, the control unit 10 stores the header 1111, the sticky note displaying position 1112 and the application associating information 1113, which are inputted, in the sticky note information table 111 as the sticky note information (S204). Then, the control unit 10 ends the electronic sticky note making process.

When the electronic sticky note making process is completed, the control unit 10 re-displays the electronic sticky note 1205 on the basis of the made and stored sticky note information. FIG. 5 shows a state in which the electronic sticky note 1205 is re-displayed.

FIG. 6 shows contents of the sticky note information table 111 at that time when the image shown in FIG. 5 is re-displayed. A serial number 001, which is corresponding to the sticky note 1205, is set in an item of ID. Information, which specifies the position where the electronic sticky 1205 is displayed, is set in an item of sticky note displaying position. The information includes "sticking AP" which means an AP on which a sticky note is stuck, and a part other than "sticking AP". Contents of the part other than "sticking AP" are dependent on the application. In the case of the electronic sticky note 1205 whose "sticking AP" is an e-mail, "mail ID" which indicates a mail document on which the electronic sticky note is stuck, and "coordinate" which indicates a position where the electronic sticky note is stuck on the mail document, are set. Further, "coordinate" indicates position and size of the electronic sticky note 1205, and is expressed in the coordinates of four corners. It is set in an item of application associating information that there is no "activated AP". That is, it is indicated that there is no associated application. It may be applicable that any data is not set in the item of application associating information in order to indicate that there is no associated application.

Figure 7:
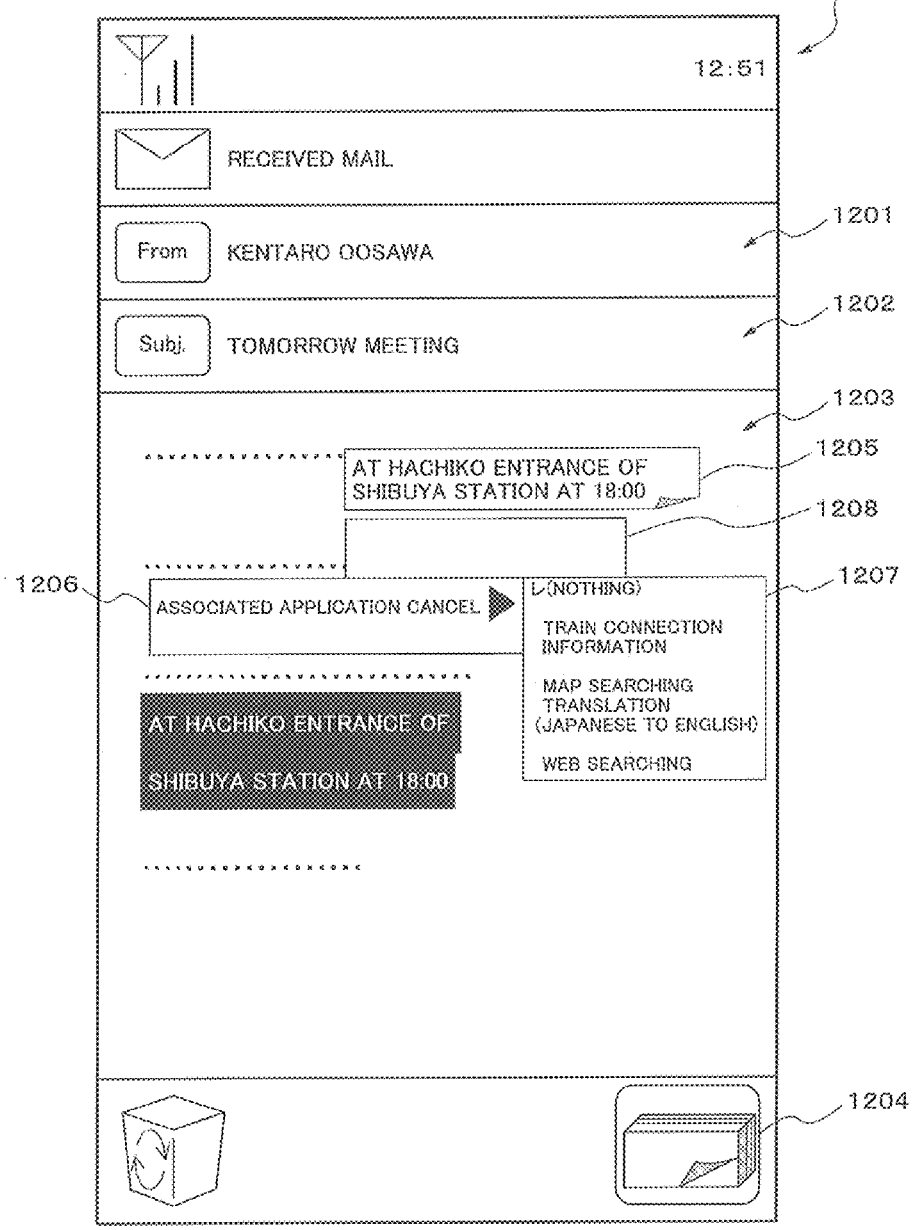
FIG. 7 shows an image displayed by the display unit of the information processing terminal.

Next, another example of the electronic sticky note making process, which is carried out in the electronic sticky note system according to the first exemplary embodiment, will be described in a sequence of time with reference to FIGS. 2, 5 and 7 to 10. FIGS. 7 to 9 show images which are displayed by the display unit 12 of the information processing terminal 1. FIG. 10 shows data which is stored in the sticky note information table 111.

FIG. 7 shows a state after it is directed to start the electronic sticky note making process afresh in the state of FIG. 5. That is, first, the sticky note displaying position 1112 is inputted by touching any part of the touch panel, or carrying out the drag operation in which the sticky note icon 1204 is dragged to the position where the sticky note is displayed (S201). Next, a new and blank electronic sticky note 1208, the associated application designating menu 1206 and the application list menu 1207 are displayed, and the application associating information 1113 is inputted (S202).

FIG. 8 shows a state in which "train connection information" is selected from the application list menu 1207, and afterward an Input window of inputting parameter for activating train connection information 1209 is displayed in the state of FIG. 7.

The Input window of inputting parameter for activating train connection information 1209 includes input columns of a getting-on station, a getting-off station, designated day and designated time which are parameters used when a train connection information application is executed, and the OK button to end the input operation. Here, the control unit 10 judges that "Shibuya station" in "Hachiko entrance of Shibuya station at 18:00", which is corresponding to the selected part out of the mail body 1203, is a destined station name, and sets "Shibuya" in a column of getting-off station automatically. Moreover, the control unit 10 judges that "18:00" in "Hachiko entrance of Shibuya station at 18:00" is an arrival time, and sets "18:00" in a column of designated time automatically. It may be applicable that these automatic settings are carried out for not the selected part out of the mail body 1203 but a whole of the mail body 1203. Moreover, it may be applicable that all input columns including these columns are inputted by hand. Here, it is assumed that "Shibuya" and "18:00" are inputted in the column of getting-off station and the column of setting time respectively, and the OK button is pressed in a state in which other input columns have no input.

When inputting the application associating information 1113 is completed by pressing the OK button, the control unit 10 receives an input of the header 1111 (S203). "Shibuya 18:00", which is an input content of the Input window of inputting parameter for activating train connection information 1209, is inputted automatically as the header 1111. It may be applicable that a part of or a whole of the text, which is inputted as the header 1111, is inputted by hand. Here, it is assumed that the text "Shibuya 18:00" is inputted as it is. Further, it may be applicable that the header 1111 is other than a text. For example, it may be applicable that, in the case that the application associated with the electronic sticky note is an application which displays image data, the header 1111 is thumbnail image data of the image.

When inputting the header 1111 is completed, the control unit 10 stores the headline 1111, the sticky note displaying position 1112 and the application associating information 1113, which are inputted, in the sticky note information table 111 as the sticky note information (S204). Then, the control unit 10 ends the electronic sticky note making process.

When the electronic sticky note making process is completed, the control unit 10 re-displays the electronic sticky note 1208 on the basis of the made and stored sticky note information. FIG. 9 shows a state in which the electronic sticky note 1208 is re-displayed. Here, an application icon 1210, which indicates to be associated with the train connection information application, is displayed on the electronic sticky note 1208.

FIG. 10 shows contents of the sticky note information table 111 at that time when the image shown in FIG. 9 is displayed. A serial number 002, which is corresponding to the sticky note 1208, is set in an item of ID. Information for activating the application, which is associated with the electronic sticky note, is set in an item of the application associating information. Train connection information is set in an item of "activated AP" which means an application to be activated. As data which is inputted to the train connection information application, Shibuya is set as "getting-off station" and 18:00 arrival is set as "designated time".

Further, while the application, which is associated when the new electronic sticky note is made, is selected in the electronic sticky note making process mentioned above, it may be applicable that making the electronic sticky note and associating the application are carried out in different processes each other. In this case, inputting the application associating information (S202), for example, is not carried out in the electronic sticky note making process. Then, the control unit 10 directs to start the application associating process for the made electronic sticky note after the electronic sticky note making process is completed, and inputs the application associating information (S202).

Figure 11:
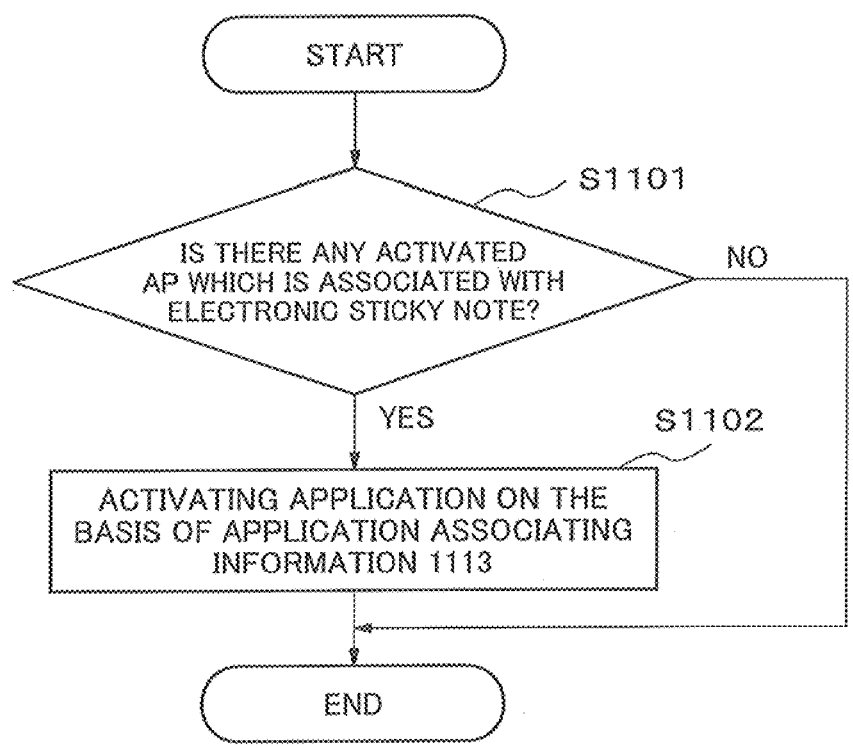
FIG. 11 is a flowchart showing an associated application executing process according to the first exemplary embodiment.
Figure 12:
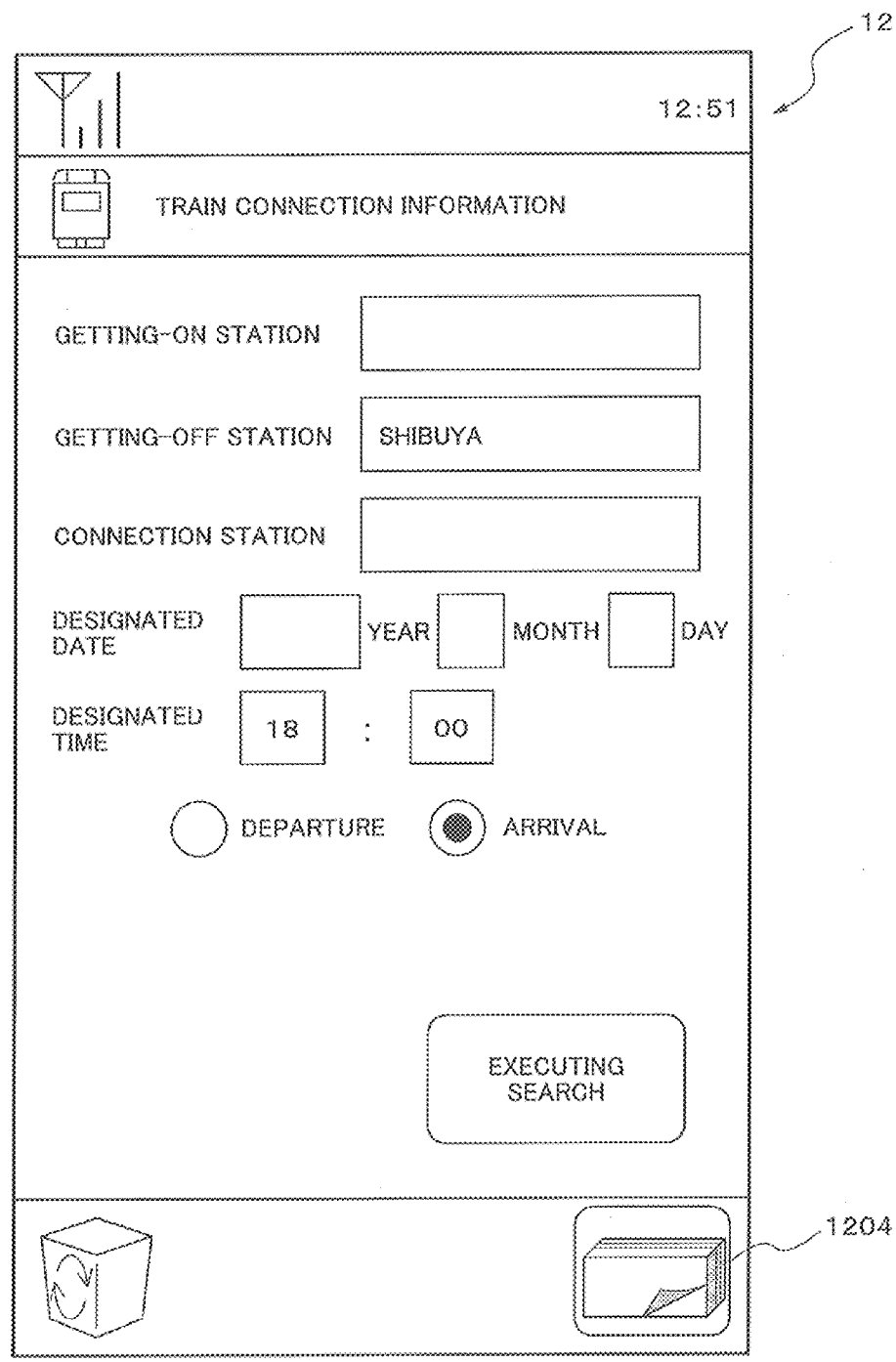
FIG. 12 shows an image displayed by the display unit of the information processing terminal.

Next, an example of an associated application executing process, which is carried out in the electronic sticky note system according to the first exemplary embodiment, will be described with reference to FIGS. 9 to 12. FIG. 11 is a flowchart showing the associated application executing process according to the first exemplary embodiment. FIG. 12 shows an image which is displayed by the display unit 12 of the information processing terminal 1.

In the case that execution of the application, which is associated with the electronic sticky note 1208, is directed in a state shown in FIG. 9, the control unit 10 reads the sticky note information corresponding to the sticky note 1208, that is, the sticky note information whose ID is 002 out of the sticky note information table 111. The direction is carried out, for example by a double-tap (operation to tap a corresponding part of the touch panel twice quickly) on the electronic sticky note 1208. The control unit 10 judges whether "activated AP", which is associated with the electronic sticky note 1208, exists (S1101) with reference to the read sticky note information.

As a next process, since the train connection information is set as "activated AP", the control unit 10 activates the train connection information application on the basis of the setting (S1102), and ends the associated application executing process. FIG. 12 shows a state in which the train connection information application is activated and a display for inputting a search condition is indicated. Further, the train connection information application is software which searches for a transfer route which makes a required time and a required fare to the destination optimal by use of a public transportation such as a train, and informs user of the optimal transfer route.

With reference to FIG. 12, Shibuya and 18:00 are inputted in the columns of "getting-off station" and "designated time" respectively. The inputted information is corresponding to the application associating information of the sticky note information which is corresponding to the electronic sticky note 1208, that is, "getting-off station" Shibuya, and "designated time" 18:00 arrival.

As described above, the electronic sticky note system according to the first exemplary embodiment can associate the electronic sticky note data with any application out of the applications which can be associated with the electronic sticky note, and can execute the application. The reason is that the electronic sticky system sets and stores the data for activating the associated application in addition to the data such as the header and the display position for displaying the electronic sticky note.

A Second Exemplary Embodiment

Next, a second exemplary embodiment of the present invention will be described.

According to the first exemplary embodiment of the present invention, number of the applications which are associated with the electronic sticky note is one. On the other hand, a plurality of applications can be associated according to the second exemplary embodiment of the present invention, differently from the first exemplary embodiment.

Since a functional configuration of the information processing terminal 1, which mounts an electronic sticky note system according to the second exemplary embodiment of the present invention, is similar to one shown in FIG. 1, description of the functional configuration of the information processing terminal 1 is omitted.

Figure 13:
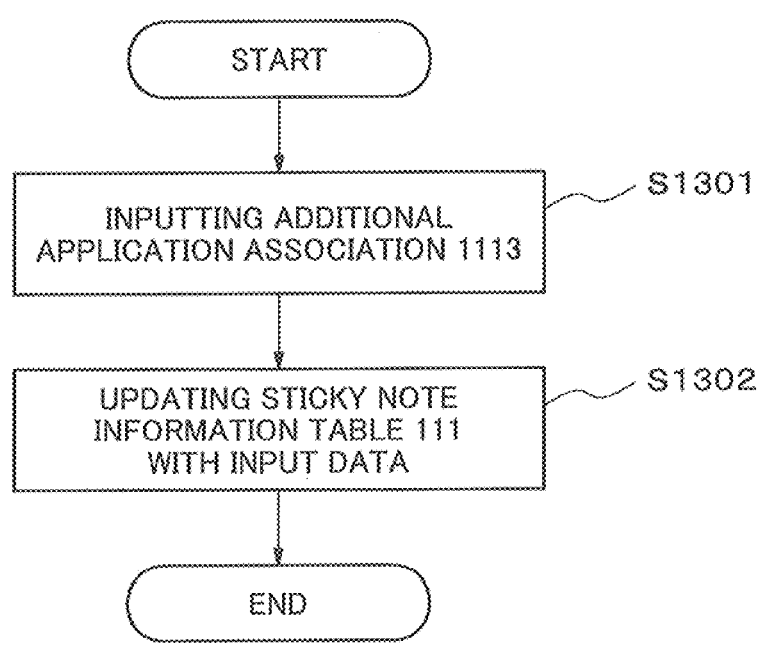
FIG. 13 is a flowchart showing an application association adding process according to a second exemplary embodiment.
Figure 14:
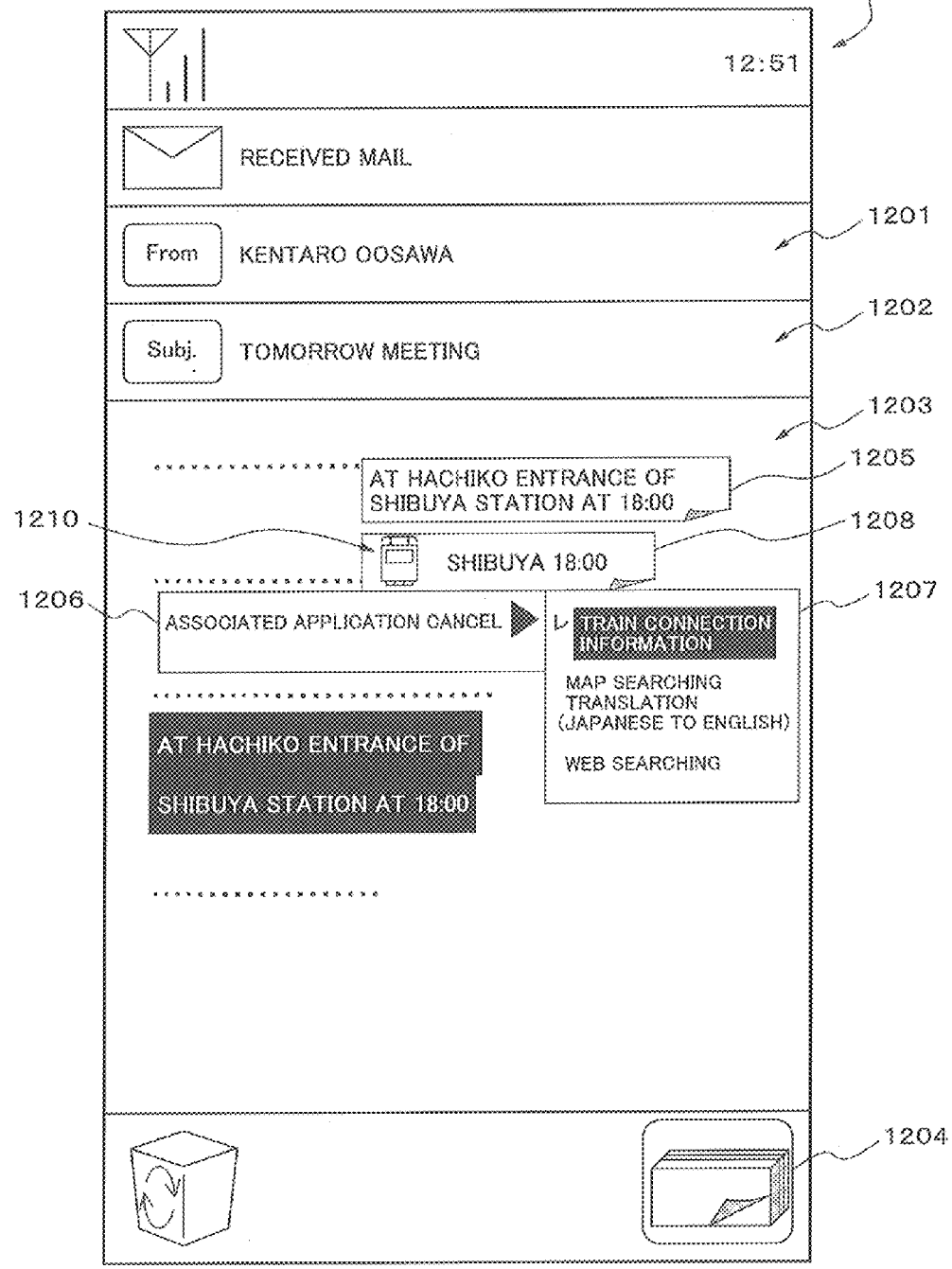
FIG. 14 shows an image displayed by the display unit of the information processing terminal.

Next, an example of an application association adding process, which is carried out in the electronic sticky note system according to the second exemplary embodiment, will be described in a sequence of time with reference to FIGS. 9, 10 and 13 to 17. FIG. 13 is a flowchart showing the application association adding process according to the second exemplary embodiment. FIGS. 14 to 16 show images each of which is displayed by the display unit 12 of the information processing terminal 1. FIG. 17 shows data which is stored in the sticky nose information table 111.

It is assumed that the display unit 12 is in a state shown in FIG. 9 at that time when the application association adding process does not start. Moreover, the sticky note information table 111 is in a state shown in FIG. 10 at the point of time.

By being directed to start the application association adding process by the input unit 13, the control unit 10 starts the process. It may be applicable that the direction is carried out, for example by touching the sticky note icon 1204 on the touch panel, and dragging the sticky note icon 1204 to a position of the electronic sticky note to which application association is added. It is assumed that the sticky note icon 1204 is dragged to a position of the electronic sticky note 1208 and addition of application association to the electronic sticky note 1208 is directed.

When it is directed to start the application association adding process, the control unit 10 receives an additional input of the application association 1113 (S1301).

FIG. 14 shows a state in which the additional input of the application associating information 1113 is received. The associated application designating menu 1206 is displayed near the electronic sticky note 1208. Moreover, the application list menu 1207 is displayed adjacently to the associated application designating menu 1206. The application list menu 1207 displays applications, which can be activated and executed in association with the electronic sticky note, in at-a-glance form, and displays "train connection information", which has been already associated, in reverse colors.

FIG. 15 shows a state in which "map searching" is selected out of the application list menu 1207 and an Input window of inputting parameter for activating map searching 1211 is displayed.

The Input window of inputting parameter for activating map searching 1211 has a column for inputting a search key which is parameter to be used when executing the map searching application, and an OK button to end the input operation. Here, the control unit 10 judges that "Shibuya station" and "Hachiko entrance" of "at Hachiko entrance of Shibuya station at 18:00", which is selected out of the mail body 1203, are place names respectively, and sets a text "Shibuya station Hachiko entrance" in a column of keyword automatically. It may be applicable that these automatic settings are carried out for not the selected part out of the mail body 1203 but a whole of the mail body 1203. It may be also applicable that these automatic settings are carried out for the sticky note information data of the electronic sticky 1208. Moreover, it may be applicable that inputting into the input columns is carried out by hand. Here, it is assumed that the text "Shibuya station Hachiko entrance" is inputted as it is, and the OK button is pressed.

When the additional input of the application associating information 1113 is completed, the control unit 10 updates the sticky note information, which is corresponding to the electronic sticky note 1208, on the stick note information table 111 by adding the application associating information 1113 which is inputted additionally (S1302). Then, the control unit 10 ends the application association adding process.

When the application association adding process is completed, the control unit 10 re-displays the electronic sticky note 1208 on the basis of the updated sticky note information. FIG. 16 shows a state in which the electronic sticky note 1208 is re-displayed. Here, it may be applicable that "+", which indicates that a plurality of applications are associated with the application icon 1210 of the electronic sticky note 1208, is marked at a lower right position of the application icon 1210.

FIG. 17 shows contents of the sticky note information table 111 at that time when the image shown in FIG. 16 is displayed. The application associating information, whose "activated AP" is "map searching", is added to the sticky note information which is corresponding to the electronic sticky note 1208 and whose ID is 002.

Further, while application association is added to the electronic sticky note, with which the application has been associated already, according to the above-mentioned application association adding process, it may be applicable that application association is added to an electronic sticky note with which any application is not associated. Moreover, it may be applicable to associate a plurality of applications when an electronic sticky note is made afresh, like the first exemplary embodiment.

Next, an example of an associated application executing process, which is carried out in the electronic sticky note system according to the second embodiment, will be described with reference to FIGS. 16 to 19. FIG. 18 is a flowchart showing the associated application executing process according to the second exemplary embodiment. FIG. 19 shows an image which is displayed by the display unit 12 of the information processing terminal 1.

When it is directed to execute the application, which is associated with the electronic sticky note 1208, in the state shown in FIG. 16, the control unit 10 reads the sticky note information corresponding to the electronic sticky note 1208, that is, the sticky note information whose ID is 002, from the sticky note information table 111. The control unit 10 judges whether "activated AP", which is associated with the electronic sticky note 1208, exists with reference to the read sticky note information (S1801).

Since "activated AP" exists on the electronic sticky note 1208, the control unit 10 judges whether a plurality of "activated APs" exist, as a next step (S1802). Two "activated APs", that is, the train connection information and the map searching exist on the electronic sticky note 1208. For this reason, the control unit 10 receives selection of "activated AP" (S1803). Further, in the case that only one "activated A?" exists, the associated application is activated immediately also according to the exemplary embodiment like the associated application executing process which is carried out in the electronic sticky note system according to the first exemplary embodiment.

FIG. 19 shows a state in which selection of "activated AP" is received. An activated AP selecting menu 1212 is displayed near the electronic sticky note 1208. Moreover, an activated AP list menu 1213 is displayed adjacently to the activated AP selecting menu 1212. The activated AP list menu 1213 displays the train connection information and the map searching, which are applications associated with the electronic sticky note 1208, in at-a-glance form on the basis of the sticky note information corresponding to the electronic sticky note 1208.

When any one of applications is selected on the basis of the activated AP list menu 1213, the control unit 10 activates the selected application (S1804), and then, ends the associated application executing process. At this point of time, the application associating information, which is corresponding to the electronic sticky note 1208, is used by the activated application like the associated application executing process which is carried out in the electronic sticky note system according to the first exemplary embodiment.

Further, while "activated AP" is selected from the menu in the case that a plurality of "activated APs" exist in the associated application executing process described above, it may be applicable that "activated AP", which is selected last time, is activated instead of the selection. Moreover, it may be applicable to set priority for a plurality of "activated APs" and to activate "activated AP" which has high priority.

As described above, the electronic sticky note system according to the second exemplary embodiment can associate a plurality of applications with the electronic sticky note, and execute a plurality of applications. The reason is that a plurality of data for activating the associated applications can be set and stored for each electronic sticky note.

A Third Exemplary Embodiment

Next, a third exemplary embodiment of the present invention will be described.

An electronic sticky note system according to the third exemplary embodiment of the present invention provides a function to display an electronic sticky note in at-a-glance form with no relation to a place where the electronic sticky note is stuck, in addition to the function of the electronic sticky note system according to the first exemplary embodiment.

Since a functional configuration of the information processing terminal 1 which mounts the electronic sticky note system according to the third exemplary embodiment of the present invention is similar to one shown in FIG. 1, description of the functional configuration of the information processing terminal 1 is omitted.

Figure 20:
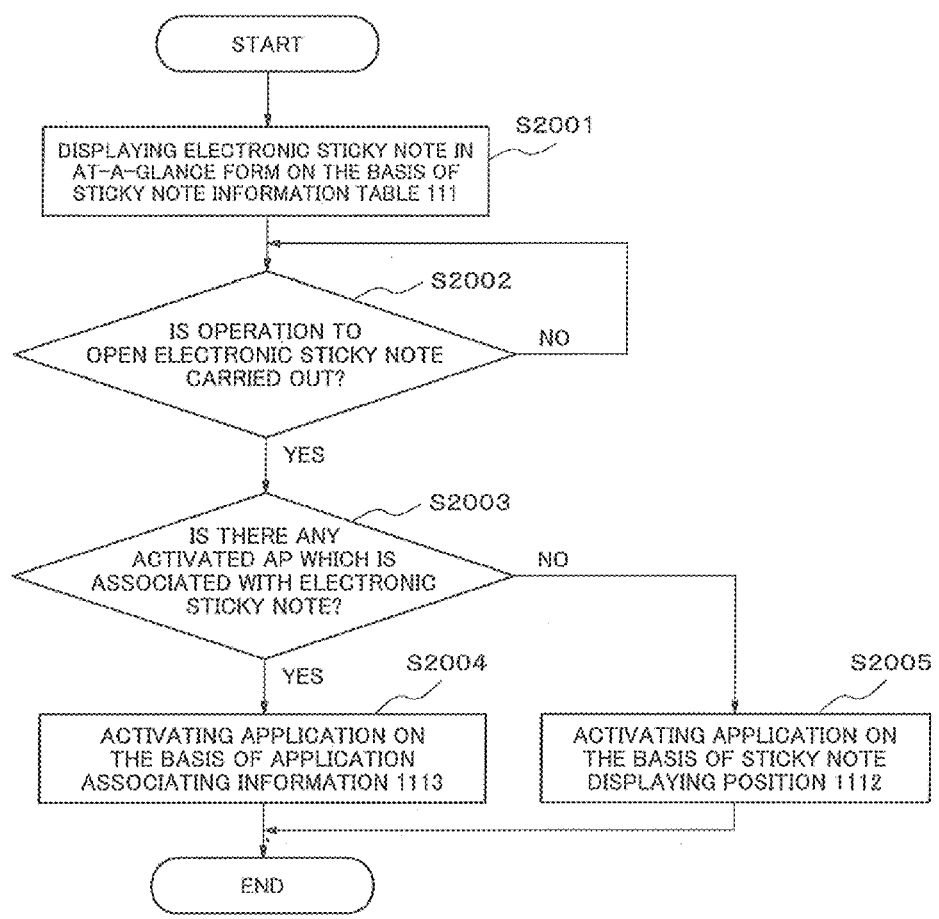
FIG. 20 is a flowchart showing a process of displaying electronic sticky note list in at-a-glance form according to a third exemplary embodiment.
Figure 21:
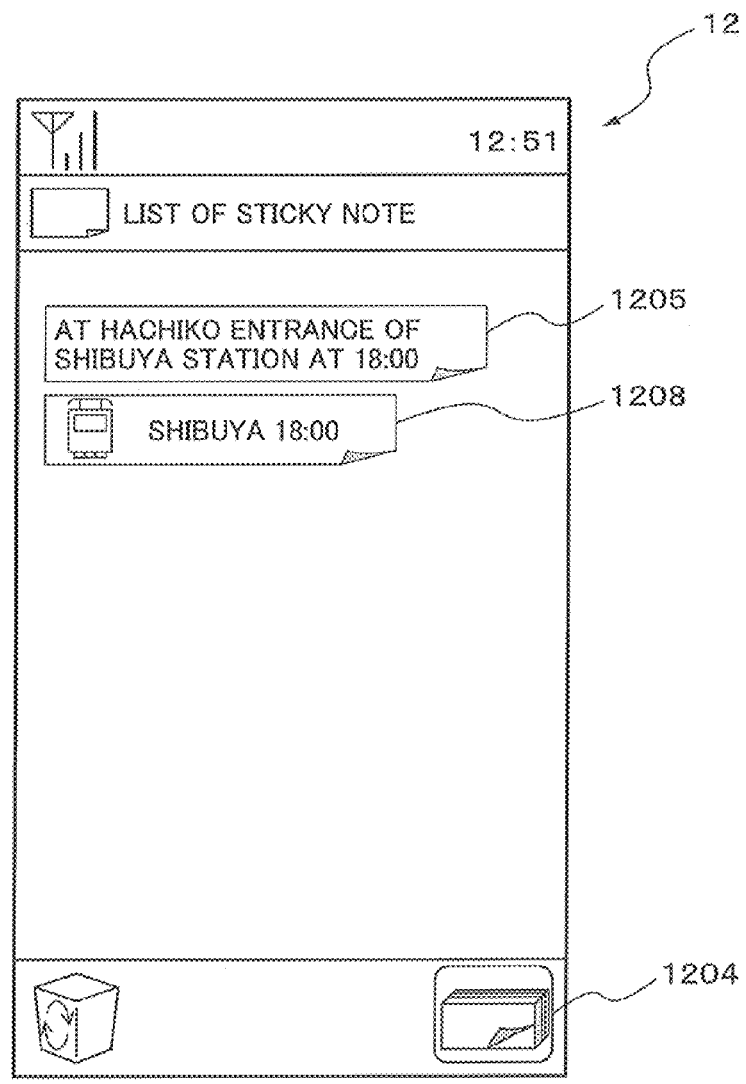
FIG. 21 shows an image displayed by the display unit of the information processing terminal.

Next, an example of a process of displaying electronic sticky note list in at-a-glance form, which is carried out in the electronic sticky note system according to the third exemplary embodiment, will be described with reference to FIGS. 9, 10, 12, 20 and 21. FIG. 20 is a flowchart showing the process of displaying electronic sticky note list in at-a-glance form according to the third exemplary embodiment. FIG. 21 shows an image which is displayed by the display unit 12 of the information processing terminal 1.

By being directed to start the process of displaying electronic sticky note list in at-a-glance form, the control unit 10 starts the process. It may be applicable that this direction is carried out, for example by touching an icon (not shown in the figure), which indicates a list of the electronic sticky notes, on a touch panel. Moreover, it may be also applicable that the direction is carried out automatically after power of the information processing terminal according to the third embodiment is turned on.

When it is directed to start the process of displaying electronic sticky note list in at-a-glance form, the control unit 10 reads the sticky note information on all the electronic sticky notes from the sticky note information table 111, and makes the display unit 12 display the electronic sticky note in at-a-glance form (S2001). Further, it is assumed that the sticky note information table 111 at that time when it is directed to start the process of displaying electronic sticky note list in at-a-glance form is in a state shown in FIG. 10.

FIG. 21 shows a state in which the process of displaying electronic sticky note list in at-a-glance form is started, and all of the electronic sticky notes, which exist on the sticky note information table 111, are indicated. At that time when the image shown in FIG. 21 is displayed, the control unit 10 waits for operating the electronic sticky note (S2002).

Next, a process, which is carried out in the case that an operation to "open" the electronic sticky note is carried out in the state shown in FIG. 21, will be described. Note, that the operation to "open" the electronic sticky note is corresponding to an operation for directing to process a targeted electronic sticky note, for example by double-tapping the targeted electronic sticky note.

When the operation to "open" the electronic sticky note 1208 is carried out, the control unit 10 judges whether "activated AP", which is associated with the electronic sticky note 1208, exists (S2003). Since the train connection information is set on the electronic sticky note 1208 as "activated AP", the control unit 10 activates the train connection information application on the basis of the application associating information 1113 as a next step (S2004). FIG. 12 shows a state in which the train connection information application is activated and a display for inputting a search condition is indicated.

Next, a process, which is carried out in the case that the operation to "open" the electronic sticky note 1205 is carried out in the state shown in FIG. 21 (S2002), will be described.

When the operation to "open" the electronic sticky note 1205 is carried out, the control unit 10 judges whether "activated AP", which is associated with the electronic sticky note 1205, exists (S2003). Since no "activated AP" is set on the electronic sticky note 1205, the control unit 10 activates an application on the basis of the sticky note displaying position 1112 (S2005). That is, the control unit 10 activates an electronic mail application on the basis of "sticking AP", and displays a mail document, on which the electronic sticky note 1205 is stuck, on the basis of "mail ID". FIG. 9 shows a state in which the electronic mail application is activated, and the mail document which the sticky note displaying position 1112 indicates, and the electronic sticky note which is stuck on the mail document are displayed.

According to the above-mentioned process of displaying electronic sticky note in at-a-glance form, the application is activated or the basis of the sticky note displaying position 1112 only if the activated AP, which is associated with the opened electronic sticky note, does not exist. However, the process of displaying electronic sticky note in at-a-glance form is not limited to such the process configuration. It may be applicable that, for example by carrying out specific operation of triple tap (operation to tap a corresponding part of the touch panel three times quickly) or the like, the application is activated on the basis of the sticky note displaying position 1112 with no relation to existence of the activated AP.

As described above, the electronic sticky note system according to the third exemplary embodiment can display the electronic sticky system in at-a-glance form with no relation to the place where the electronic sticky note is stuck. The reason is that the electronic sticky system displays the electronic sticky note in at-a-glance form on the basis of the sticky note information table 111 with no relation to the sticky note displaying position 1112. By virtue of the above mention, the electronic sticky note system according to the third exemplary embodiment can refer to the electronic sticky note or execute the associated application without activating the application on which the electronic sticky note is stuck.

Moreover, the electronic sticky note system according to the third exemplary embodiment can activate the application on which the electronic sticky note is stuck, and indicate the place where the electronic sticky note is stuck without designating the place where the electronic sticky note is stuck. The reason is that the electronic sticky system activates the application on the basis of the sticky note displaying position 1112 and indicates the place where the electronic sticky note is stuck, by "opening" the electronic sticky note which is displayed in at-a-glance form. By virtue of the above mention, the electronic sticky note system according to the third exemplary embodiment can use the electronic sticky note like "bookmark" without being conscious of the position where the electronic sticky note is stuck.

As described in each of the exemplary embodiment of the present invention, the exemplary embodiment has been described by using the example of the information processing terminal which is equipped with the touch panel for inputting the position information. However, it may be applicable that the information processing terminal which mounts the electronic sticky note system according to the embodiment of the present invention is equipped with other input device such as a mouse, a trackball and a cursor key for inputting the position information.

It may be applicable that the electronic sticky note system according to the first to the third exemplary embodiments of the present invention has a function to move and copy the electronic sticky note. For example, an electronic sticky note, which is stuck on one application display, is moved to the other application display. It may be also applicable that an electronic sticky note, which is stuck on one application display, is copied and afterward stuck on the other application display.

In the case that the electronic sticky note is copied in the electronic sticky note system according to the first to the third exemplary embodiments of the present invention, the sticky note information of the copied electronic sticky note is made newly by copying data on the original sticky note information. In this case, since it is possible to change the header and the application associating information after copying, it is very convenient in the case of making a new and similar electronic sticky note.

It may be also applicable that, in the case that the electronic sticky note is copied, a plurality of items of the sticky note displaying position, which is included in the record of the sticky note information, are set so as to copy the electronic sticky note. In this case, the header and the application associating information are shared by both the original electronic sticky note and the copied electronic sticky note. According to each of the exemplary embodiment mentioned above, since contents of plural electronic sticky notes are managed in one united group, it is convenient.

While the present invention has been described with reference to the exemplary embodiment mentioned above, the present invention is not limited to the above-mentioned exemplary embodiment. With regard to the configuration and details of the present invention, it is possible to carry out various modifications, which are apparent to a person skilled in the art, within the scope of the present invention.

The invention claimed is:

1. An electronic sticky note system equipped in an information processing terminal, comprising:
    a display that displays a mail including a text when an electronic mail application is activated;
    an input device that receives an input for generating an electronic sticky note and an input for sticky note information;
    a storage device that stores the sticky note information which includes header information to be displayed in a display area for the electronic sticky note, sticky note displaying position information indicating a position in which the electronic sticky note is to be displayed, and application associating information corresponding to information for activating an application selected from one or more applications that are associated with the electronic sticky note; and
    a controller that generates, in response to the input for generating the electronic sticky note, the electronic sticky note based on at least a part of the text of the mail and displays, on the display, the electronic sticky note on the basis of the header information and the electronic sticky note displaying position information and executes the application, selected from the one or more applications that are associated with the electronic sticky note, on the basis of the application associating information, wherein an application, which is associated with the electronic sticky note, includes the application which is indicated by the sticky note displaying position information and other application information corresponding to the application associating information included in the sticky note information, wherein the controller is capable of activating a specific application, selected according to a user's input, corresponding to an electronic sticky note selected from the displayed electronic sticky note, wherein the selected electronic sticky note is associated with the sticky note information corresponding to the specific application in the storage device, and, wherein, when the controller activates the specific application, the controller automatically selects, from the text of the mail, at least one parameter for activating the specific application.

2. The electronic sticky note system according to claim 1, wherein the controller furthermore displays, on the display, the electronic sticky note in at-a-glance form on the basis of the sticky note information and executes an application on the basis of the sticky note displaying position information.

3. The electronic sticky note system according to claim 1, wherein the sticky note information includes not less than the two application associating information.

4. The electronic sticky note system according to claim 1, wherein the sticky note information includes not less than the two sticky note displaying position information.

5. The electronic sticky note system according to claim 1, wherein the storage adds and stores the application associating information.

6. An information processing terminal comprising the electronic sticky note system described in claim 1.

7. The electronic sticky note system equipped in an information processing terminal according to claim 1, wherein
the controller that displays, on the display, an associated application designating menu displayed adjacent to the electronic sticky note.

8. A method for processing an electronic sticky note in an information processing terminal, comprising:
displaying a mail including a text when an electronic mail application is activated; receiving an input for generating an electronic sticky note and an input for sticky note information;
storing the sticky note information which includes header information to be displayed in a display area for an electronic sticky note, sticky note displaying position information indicating a position in which the electronic sticky note is to be displayed, and application associating information corresponding to information for activating an application selected from one or more applications that are associated with the electronic sticky note;
generating, in response to the input for generating the electronic sticky note, the electronic sticky note based on at least a part of the text of the mail and displaying the electronic sticky note on the basis of the header information and the electronic sticky note displaying position information; and
executing the application, selected from the one or more applications that are associated with the electronic sticky note, on the basis of the application associating information,
wherein an application, which is associated with the electronic sticky note, includes the application which is indicated by the sticky note displaying position information and other application information corresponding to the application associating information included in the sticky note information, wherein a specific application, selected according to a user's input, corresponding to an electronic sticky note selected from the displayed electronic sticky note is controlled to be activated, wherein the selected electronic sticky note is associated with the sticky note information corresponding to the specific application in the storage device, and, wherein, when the specific application is controlled to be activated, at least one parameter for activating the specific application is automatically selected from the text of the mail.

9. The method for processing the electronic sticky note according to claim 8, further comprising displaying the electronic sticky note in at-a-glance form on the basis of the sticky note information, and executing an application on the basis of the sticky note displaying position information.

10. The method for processing the electronic sticky note according to claim 8,
wherein the sticky note information includes not less than the two application associating information.

11. The method for processing the electronic sticky note according to claim 8,
wherein the sticky note information includes not less than the two sticky note displaying position information.

12. The method for processing the electronic sticky note according to claim 8, further comprising adding and storing the application associating information.

13. A non-transitory computer-readable medium storing a program causing a computer to execute an electronic sticky note process in an information processing terminal, the electronic sticky note process comprising:
displaying a mail including a text when an electronic mail application is activated;
receiving an input for generating an electronic sticky note and an input for sticky note information;
storing the sticky note information which includes header information to be displayed in a display area for an electronic sticky note, sticky note displaying position information indicating a position in which the electronic sticky note is to be displayed, and application associating information corresponding to information for activating an application selected from one or more applications that are associated with the electronic sticky note;
generating, in response to the input for generating the electronic sticky note, the electronic sticky note based on at least a part of the text of the mail and displaying the electronic sticky note on the basis of the header information and the electronic sticky note displaying position information; and
executing the application, selected from the one or more applications that are associated with the electronic sticky note, on the basis of the application associating information,
wherein an application, which is associated with the electronic sticky note, includes the application which is indicated by the sticky note displaying position information and other application information corresponding to the application associating information included in the sticky note information, wherein a specific application, selected according to a user's input, corresponding to an electronic sticky note selected from the displayed electronic sticky note is controlled to be activated, wherein the selected electronic sticky note is associated with the sticky note information corresponding to the specific application in the storage device, and, wherein, when the specific application is controlled to be activated, at least one parameter for activating the specific application is automatically selected from the text of the mail.

14. The non-transitory computer-readable medium storing the program according to claim 13 causing a computer to execute an electronic sticky note process further comprising displaying the electronic sticky note in at-a-glance form on the basis of the sticky note information, and executing an application on the basis of the sticky note displaying position information.

15. The non-transitory computer-readable medium storing the program according to claim 13 causing a computer to execute an electronic sticky note process, wherein the sticky note information includes not less than the two application associating information.

16. The non-transitory computer-readable medium storing the program according to claim 13 causing a computer to execute an electronic sticky note process, wherein the sticky note information includes not less than the two sticky note displaying position information.

17. The non-transitory computer-readable medium storing the program according to claim 13 causing a computer to execute an electronic sticky note process further comprising adding and storing the application associating information.

18. An electronic sticky note system equipped in an information processing terminal, comprising:
- a display that displays a mail including a text when an electronic mail application is activated;
- a storage that stores sticky note information which includes header information to be displayed in a display area for the electronic sticky note, sticky note displaying position information indicating a position in which the electronic sticky note is to be displayed, and application associating information corresponding to information for activating an application selected from one or more applications that are associated with the electronic sticky note;
- at least one processor operable to read and operate according to instructions within a computer program; and
- at least one memory operable to store at least portions of said computer program for access by said processor;

wherein said program includes algorithms to cause said processor to implement: an input device that receives an input for generating the electronic sticky note and an input for the sticky note information; and a controller for generating, in response to the input for generating the electronic sticky note, the electronic sticky note based on at least a part of the text of the mail and displaying, on the display, the electronic sticky note on the basis of the header information and the electronic sticky note displaying position information and for executing the application, selected from the one or more applications that are associated with the electronic sticky note, on the basis of the application associating information, wherein an application, which is associated with the electronic sticky note, includes the application which is indicated by the sticky note displaying position information and other application information corresponding to the application associating information included in the sticky note information, wherein the controller is capable of activating a specific application, selected according to a user's input, corresponding to an electronic sticky note selected from the displayed electronic sticky note, wherein the selected electronic sticky note is associated with the sticky note information corresponding to the specific application in the storage, and, wherein, when the controller activates the specific application, the controller automatically selects, from the text of the mail, at least one parameter for activating the specific application.

* * * * *